Jan. 26, 1960     H. E. FADER     2,922,416
VEHICLE SEAT IMPROVEMENT
Filed June 7, 1957
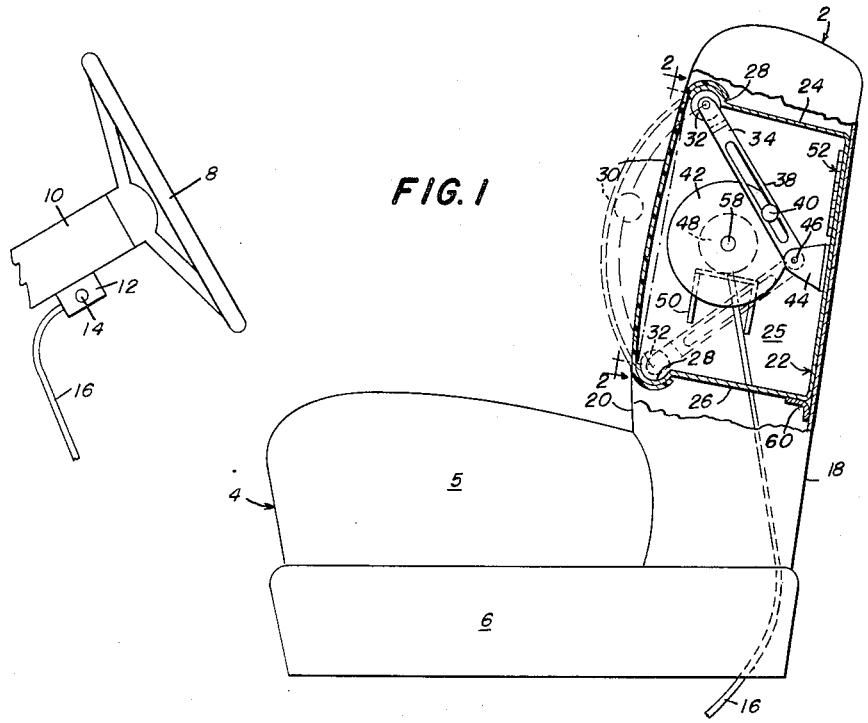
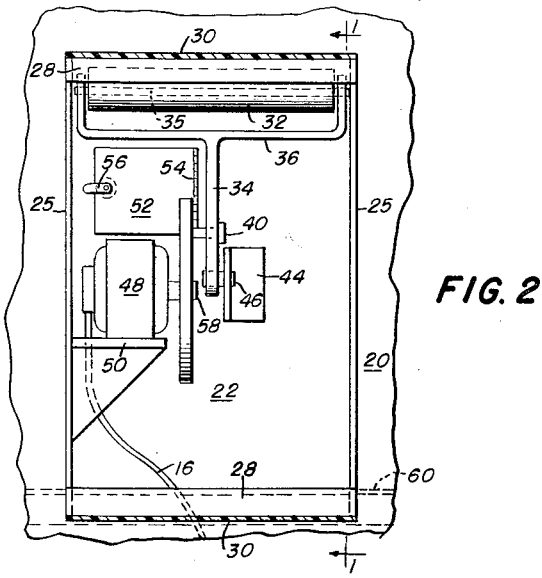
INVENTOR
HERBERT EDWARD FADER
BY *J. Gibson Semmes*
ATTORNEY

United States Patent Office 2,922,416
Patented Jan. 26, 1960

2,922,416

VEHICLE SEAT IMPROVEMENT

Herbert Edward Fader, Bradenton, Fla.

Application June 7, 1957, Serial No. 664,276

3 Claims. (Cl. 128—57)

This invention relates to improvements in seat construction and the like, more particularly to improved features for relieving back fatigue of a vehicle seat occupant.

In this modern age of high speed and long distance vehicular travel, it is widely recognized that a major cause of accidents is due to driver fatigue. A great amount of this driver fatigue is attributable to muscular tension originating in the back and local spinal cord area. The muscles in these areas are constricted during driving to an unnatural tautness which is engendered by the occupant or driver's constant adjustment to the changing inertia of the moving vehicle and to the vertical movement in travel. Numerous earlier inventors have devoted their attention to this problem having attempted solution by sectioning seat bottom and back portions so that they are shiftable independently of each other, thereby attempting to relieve friction between the driver's body and the back seat. Most of these devices were designed to prevent vehicle motion or bumping from being transmitted unto the seat occupant. Recognizing that the spring and cushioning features of modern vehicle seats have largely alleviated this problem, I have devoted my efforts to further relieving back fatigue by massaging the seat occupant's back in the area of fatigue.

As will be seen, my device may be inserted within the vehicle seat back without altering its appearance. It does not depend on the motion or bumping of the vehicle, but is actuatable by means of an electric motor.

Because my massaging device relieves fatigue almost instantly, it provides physical relaxation and restimulation to the driver or the occupants of vehicle seats which have been modified with my device. It is this relaxation from tension and the driver's awareness of the possibilities of instantly relaxing himself which I believe will contribute to a further mental relaxation which will decrease automobile accidents. It is submitted that it will increase driver efficiency in that the driver, realizing that he has means for instant relief from fatigue, would tend to extend periods of driving resulting in the achievement of greater driving distance at great safety. For, dangerous moments when the driver is forced to stretch within the seat while driving are eliminated by utilizing my device. It is felt that my invention will be an aid to the health and disposition of the hundreds of thousands of taxi and truck drivers who drive vehicles eight or more hours a day.

Accordingly, it is an object of invention to provide within a vehicle seat back means for massaging the seat occupant's back, said massaging means being mechanical and actuatable at the will of the seat occupant. A preferred embodiment of the invention is illustrated in the accompanying drawings, in which:

Figure 1 represents a vehicle seat in side elevation showing its relation to vehicle steering wheel, a fragmentary portion being broken away;

Figure 2 is a front elevation of a portion of the vehicle seat taken along section lines 2—2 of Figure 1;

In Figure 1 the vehicle seat is represented as comprising seat upright portion 2, seat horizontal portion generally designated as 4, having bottom cushion 5 and base portion 6. The steering wheel 8 is mounted conventionally on a steering column 10, said steering column having attached thereto a micro switch box 12 for actuating my device, a switch button 14 and wire 16 leading to the motor 48 within the seat upright portion 2.

The seat upright portion 2 is further designated as having seat upright rear surface 18 and seat upright forward surface 20. Between these rear and forward surfaces and entirely within the seat upright portion 2 is placed a box-like or rectangular shell 22, said shell having a shell top 24, side portions 25 and bottom portion 26. Flange portions 28 have been formed at the front extremities of shell top and bottom portions. The shell 22 may be mounted on a horizontal angle brace 60, said brace being positioned between the sides of the seat upright portion and secured by means of suitable brackets, not indicated, within these side portions. Optionally, rubber gaskets or washers may be inserted between the shell bottom portion 26 and the angle brace 60 to reduce seat vibration transmitted by the motor 48 while in operation. The front portion of my box-like shell 22 consists of a vertically disposed flexible cloth or plastic strip 30 which is pressed into cyclic protrusion by a roller tipped actuating arm generally designated as 34 and having a horizontal roller-tip 32 axially mounted on a cross piece 35 held between the U-shaped portion 36 of the actuating arm. The roller-tip 32 slidably engages the flexible strip 30. The mid portion 38 of this actuating arm has been modified so that a longitudinal recess is formed for engaging a stud 40 attached to disc 42 which is revolvably actuated by motor 48. The actuating arm 34 is pivotally mounted at 44 by means of a bracket attached to the rear side 25 of my shell 22. A stud 46 pivotally retains the actuating arm 34 to the bracket 44. The motor 48 is mounted on a shelf 50 which has been attached to a side 25 of my shell. For access to the motor 48 and actuating arm 34, a hinged access panel 52, having hinges 54 and optional catch 56 may be inserted within a side 25 of the shell. This panel enables access from the vehicle seat upright rear surface 18. As may be readily seen, the vertically disposed disc or cam 58 is mounted on the horizontal motor shaft 58.

In actual operation my device is operated by the vehicle seat driver's pressing the switch button 14 which in turn causes motor 48 to revolvably actuate disc or cam 42, said cam in turn actuating the roller tipped arm between the flange portions 28 of my shell top 24 and shell bottom 26. In the course of its arcuate travel between these flanges, the actuating arm 34 slidably engages the flexible plastic strip 30 and presses said flexible strip into arcuate protrusion, said roller tipped arm simultaneously pressing and rolling against the seat occupant's back. Thus, the occupant of the seat is afforded a massage of muscles within his spinal region and is thereby relieved from the type of back fatigue which accompanies vehicle driving.

It will be apparent from the foregoing that my device may be inserted within any vehicle seat, so that other passengers, in addition to the driver, may be provided with the means for relieving back fatigue.

It is obvious that numerous alterations and modifications may be taken without departing from the spirit of my invention which I claim as follows:

1. In a device for relieving back fatigue the combination of a seat back, a box-like shell mounted on a transverse support element of said seat back, and shell contents comprising a motor mounted within said shell, a roller-tipped arm pivotally mounted within said shell, in actuable engagement with said motor, and a vertically disposed flexible strip integrally mounted within a forward surface of the seat back, said roller-tipped arm slidably engaging said flexible strip and being actuable to and fro between the vertical extremities of said flexible strip by said motor, said roller-tipped arm forcing said flexible strip into arcuate protrusion and simultaneously pressing and rolling against the seat occupant's back according as said roller-tipped arm is actuated between the vertical extremities of said flexible strip.

2. In a device for relieving back fatigue the combination of a seat back, a box-like shell mounted on a transverse support element of said seat back, and shell contents comprising a motor mounted within said shell, a roller-tipped arm pivotally mounted within said shell, in actuable engagement with said motor, and a vertically disposed flexible strip integrally mounted within a forward surface of the seat back, said flexible strip being vertically disposed so as to be in substantial alignment with the spinal cord area of the seat occupant's back and being horizontally disposed in parallel relation to the forward surface of the seat back, said roller tipped arm slidably engaging said flexible strip and being actuable to and fro between the vertical extremities of said flexible strip by said motor, said roller-tipped arm forcing said flexible strip into arcuate protrusion and simultaneously pressing and rolling against the seat occupant's back according as said roller-tipped arm is actuated between the vertical extremities of said flexible strip.

3. A device for relieving back fatigue as in claim 2, said box-like shell comprising substantially rectangular rear and side upstanding members and upper and lower horizontal members attached to said upstanding members, said upper and lower horizontal members having substantially rectangular bases with longitudinal flanges at their forward edges, said longitudinal flanges receiving said roller-tipped arm at the extremities of its arcuate actuation and partially securing said roller tip for storage while not in use.

References Cited in the file of this patent

UNITED STATES PATENTS

| | | |
|---|---|---|
| 86,604 | Taylor | Feb. 2, 1869 |
| 1,129,802 | Hoard | Feb. 23, 1915 |
| 1,214,305 | Hoard | Jan. 30, 1917 |
| 1,776,806 | Carlson | Sept. 30, 1930 |
| 2,041,693 | Boltz et al. | May 26, 1936 |
| 2,446,098 | Niblack | July 27, 1948 |
| 2,461,102 | Ackerman | Feb. 8, 1949 |